US011993722B2

United States Patent
Kline et al.

(10) Patent No.: US 11,993,722 B2
(45) Date of Patent: May 28, 2024

(54) TWICE RECYCLED POLYMER POWDER COMPOSITION FOR ADDITIVE MANUFACTURING INCLUDING PEKK, SILOXANE AND CARBON FIBER

(71) Applicant: Hexcel Corporation, Stamford, CT (US)

(72) Inventors: Whitney Kline, Ellington, CT (US); Alden Winn, Glastonbury, CT (US); Lawrence Varholak, Southbury, CT (US)

(73) Assignee: Hexcel Corporation, Stamford, CT (US)

( * ) Notice: Subject to any disclaimer, the term of this patent is extended or adjusted under 35 U.S.C. 154(b) by 663 days.

(21) Appl. No.: 16/422,283

(22) Filed: May 24, 2019

(65) Prior Publication Data
US 2020/0369898 A1    Nov. 26, 2020

(51) Int. Cl.
    *C09D 11/102*      (2014.01)
    *B29C 64/153*      (2017.01)
    *B29C 64/20*      (2017.01)
    *B29K 71/00*      (2006.01)
    *B33Y 10/00*      (2015.01)
    *B33Y 30/00*      (2015.01)
    (Continued)

(52) U.S. Cl.
CPC .......... *C09D 11/102* (2013.01); *B29C 64/153* (2017.08); *B33Y 10/00* (2014.12); *B33Y 70/00* (2014.12); *C09D 11/037* (2013.01); *B29C 64/20* (2017.08); *B29K 2071/00* (2013.01); *B33Y 30/00* (2014.12)

(58) Field of Classification Search
None
See application file for complete search history.

(56) References Cited

U.S. PATENT DOCUMENTS

| 3,065,205 A | 11/1962 | Williard, Jr. |
| 3,441,538 A | 4/1969 | Marks et al. |
| 3,442,857 A | 5/1969 | Thornton et al. |

(Continued)

FOREIGN PATENT DOCUMENTS

| CN | 108290347 | * | 7/2018 | |
| CN | 108472723 A | * | 8/2018 | ............ B22F 1/0059 |

(Continued)

OTHER PUBLICATIONS

FR-3029830-A1 detailed description translation (Year: 2022).*

(Continued)

*Primary Examiner* — Jeffrey M Wollschlager
*Assistant Examiner* — Guy F Mongelli
(74) *Attorney, Agent, or Firm* — Welsh IP Law LLC

(57) ABSTRACT

A powder composition suitable for use in selective laser sintering for printing an object. The powder composition includes a first fraction having a polyetherketoneketone (PEKK) powder having a plurality of particles. The powder composition includes a second fraction having a plurality of siloxane particles that is dry blended with the PEKK powder prior to selective laser sintering of the powder. In some embodiments, the powder composition includes a third fraction of carbon fiber. The powder composition when used in selective laser sintering results in parts with more consistent results and improves process economics.

10 Claims, 5 Drawing Sheets

(51) Int. Cl.
*B33Y 70/00* (2020.01)
*C09D 11/037* (2014.01)

(56) References Cited

U.S. PATENT DOCUMENTS

| | | | |
|---|---|---|---|
| 3,516,966 A | 6/1970 | Berr et al. | |
| 4,704,448 A | 11/1987 | Brugel | |
| 4,710,562 A | 12/1987 | Maresca | |
| 4,816,556 A | 3/1989 | Gay et al. | |
| 5,817,206 A * | 10/1998 | McAlea | C08J 3/122 |
| | | | 156/308.2 |
| 6,177,518 B1 | 1/2001 | Lahijani | |
| 8,299,208 B2 | 10/2012 | Muller | |
| 10,112,342 B2 | 10/2018 | DeFelice et al. | |
| 10,254,499 B1 * | 4/2019 | Cohen | B33Y 70/10 |
| 10,968,340 B1 * | 4/2021 | Mapkar | B29C 48/022 |
| 11,639,053 B2 * | 5/2023 | Veregin | B29B 7/90 |
| | | | 264/497 |
| 2001/0008230 A1 * | 7/2001 | Keicher | B29C 64/153 |
| | | | 219/121.63 |
| 2003/0004600 A1 * | 1/2003 | Priedeman, Jr. | C08L 81/06 |
| | | | 700/119 |
| 2005/0004326 A1 * | 1/2005 | Seargeant | H01B 3/427 |
| | | | 525/474 |
| 2006/0071359 A1 | 4/2006 | Monsheimer et al. | |
| 2006/0118532 A1 | 6/2006 | Chung et al. | |
| 2006/0134419 A1 | 6/2006 | Monsheimer et al. | |
| 2007/0197739 A1 * | 8/2007 | Aneja | C08L 71/10 |
| | | | 525/437 |
| 2008/0071030 A1 * | 3/2008 | Priedeman, Jr. | B29C 64/40 |
| | | | 525/185 |
| 2008/0258330 A1 * | 10/2008 | Muller | B29B 9/16 |
| | | | 528/125 |
| 2010/0147548 A1 | 6/2010 | Bhandari et al. | |
| 2011/0144752 A1 | 6/2011 | Defelice et al. | |
| 2011/0240200 A1 | 10/2011 | Korya et al. | |
| 2013/0065073 A1 | 3/2013 | Fuwa | |
| 2013/0217838 A1 | 8/2013 | DeFelice et al. | |
| 2013/0323416 A1 * | 12/2013 | Bertelo | C08L 61/16 |
| | | | 524/592 |
| 2015/0061195 A1 | 3/2015 | DeFelice et al. | |
| 2015/0148467 A1 | 5/2015 | Greger et al. | |
| 2016/0368635 A1 * | 12/2016 | Hammad | B65B 43/04 |
| 2017/0242372 A1 | 8/2017 | Omori et al. | |
| 2018/0046107 A1 | 2/2018 | Orrock et al. | |
| 2018/0200922 A1 | 7/2018 | DeFelice et al. | |
| 2018/0200960 A1 | 7/2018 | DeFelice et al. | |
| 2018/0201783 A1 | 7/2018 | DeFelice et al. | |
| 2019/0062498 A1 * | 2/2019 | Brule | C08G 65/4012 |
| 2019/0200922 A1 | 7/2019 | Zhang et al. | |
| 2020/0079984 A1 * | 3/2020 | Brule | C08G 65/4012 |
| 2020/0114574 A1 * | 4/2020 | Kamoda | B29B 9/12 |
| 2020/0307027 A1 * | 10/2020 | Veregin | C08J 3/215 |
| 2020/0362120 A1 * | 11/2020 | Frangov | C08J 3/203 |
| 2020/0369898 A1 * | 11/2020 | Kline | C09D 11/037 |
| 2021/0394438 A1 * | 12/2021 | Louis | B33Y 70/00 |

FOREIGN PATENT DOCUMENTS

| | | | | |
|---|---|---|---|---|
| CN | 108606860 A | * | 10/2018 | A61F 2/30942 |
| EP | 1674497 A1 | | 6/2006 | |
| EP | 2709827 A1 | | 3/2014 | |
| FR | 3029830 A1 | * | 6/2016 | B29C 64/153 |
| WO | 2005097475 A1 | | 10/2005 | |
| WO | 2011149101 A1 | | 12/2011 | |
| WO | 2014100320 A1 | | 6/2014 | |
| WO | WO-2017060573 A2 | * | 4/2017 | B22F 1/0018 |
| WO | 2019150060 A1 | | 8/2019 | |

OTHER PUBLICATIONS

CN-108472723-A (Year: 2023).*
CN-108606860-A (Year: 2023).*
European Search Report Application No. EP 12 85 4869 Completed: May 26, 2015 7 pages.
International Search Report and Written Opinion of the International Searching Authority Application No. PCT/FR2018/050257 Completed: May 2, 2019; dated May 9, 2019 10 pages.
International Search Report & Written Opinion of the International Searching Authority Application No. PCT/US2012/067855 Completed: Feb. 25, 2013; dated Mar. 13, 2013 pages 8 pages.
U.S. Office Action U.S. Appl. No. 13/705,332 dated Mar. 31, 2017 16 pages.
U.S. Office Action U.S. Appl. No. 13/705,332 dated Sep. 28, 2017 18 pages.
U.S. Office Action U.S. Appl. No. 13/705,332 dated Jan. 28, 2016 14 pages.
Chang et al., Novel Acrylated Urethane Silicone Polymers and Formulations to Increase Elongation in 3D Printing Resins, Mar. 2018.
Written Opinion of the ISA in related case PCT/US2020/022546 dated Jun. 18, 2020.
Cheng, Z. D. et al; "Polymorphism and crystal structure identification in poly(aryl ether ketone ketone)s," Macromol. Chem. Phys. 197, 185-213 (1996) Abstract.

* cited by examiner

TWICE RECYCLED POLYMER POWDER COMPOSITION FOR ADDITIVE MANUFACTURING INCLUDING PEKK, SILOXANE AND CARBON FIBER

TECHNICAL FIELD

The present disclosure generally relates to additive manufacturing technology and techniques, and more specifically relates to a polyetherketoneketone ("PEKK") powder composition for use in selective laser sintering ("SLS" or "LS"), a method for preparing the powder composition, and a method for additively manufacturing an object using the PEKK powder composition.

BACKGROUND

It is known to use additive manufacturing technology and techniques, together with polymer powders, to manufacture high-performance products having applications in various industries (e.g., aerospace, industrial, medical, etc.).

SLS is an additive manufacturing technique that uses a laser to fuse small particles of plastic, metal (direct metal laser sintering), ceramic, or glass powders into a mass having a desired three-dimensional (3-D) shape. The laser selectively fuses the powder material by scanning cross-sectional layers generated from a 3-D digital description of the desired object onto the top layer of a bed of the powder material. After a cross-sectional layer is scanned, the powder bed is lowered by one-layer thickness in a z-axis direction, a new top layer of powder material is applied to the powder bed, and the powder bed is rescanned. This process is repeated until the object is completed. When completed, the object is formed in a "cake" of unfused powder material. The formed object is extracted from the cake. The powder material from the cake can be recovered, sieved, and used in a subsequent SLS process.

Polyaryletherketones ("PAEK") are of interest in the SLS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK").

PEKK powders are of particular interest in the SLS process because objects that have been manufactured from PEKK powders via SLS have demonstrated not only the above characteristics but also superior strength relative to other PAEK materials.

PEKK powders are unique in the SLS technique because unused PEKK powder can be recycled in subsequent SLS processes and the resultant pieces exhibit increased strength as compared to similar parts made with virgin powder. After an SLS build, the mass yield from the built part relative to the unsintered powder is typically less than 20% of the powder material used in the LS process.

After the parts are removed from the cake bed, the remaining PEKK material is referred to as used PEKK material or recycled PEKK material. This material is referred to as used or recycled because it has been used at least once in the SLS process. In other words, this material has been raised to the bed temperature and added to the bed in a layer-wise fashion. Material adjacent to the used material was sintered in the initial SLS process.

After the parts are removed from the cake, the PEKK powder forming the cake is recycled for subsequent use in the SLS process. Sieving of the cake is performed to restore common size to the recovered cake structure, which is typically lumpy. The sieve size may be similar to the original powder or the sieve size may be different than the original powder. In the process described, it is preferred that the sieve size falls in the 20-200 micron range. It is possible to blend batches of used sieved PEKK powder. However, it is preferred that batches of used sieved PEKK powder that are blended have similar thermodynamic properties. The use of DSC, FTIR, and other analytical methods may be used to determine which batches of used sieved PEKK powder can be mixed. A test build can be used to validate analytical results.

The Applicant is the owner of U.S. Patent Publication No. US 20130217838 for a Method for Processing PAEK and Articles Manufactured from the Same the contents of which are incorporated herein by reference. As set forth in that disclosure, the SLS powder may be subject to multiple iterations of recycle. The term virgin powder in the context of SLS recycling refers to a SLS powder that has not been subjected to ambient chamber conditions during a SLS build. The term first recycle or Cake A refers to a batch of powder that has been previously exposed to ambient chamber conditions in one SLS build. The term second recycle or Cake B refers to a batch of powder that has been previously exposed to ambient chamber conditions in two SLS builds. Cake C has been exposed to three builds, and so forth.

A disadvantage of known recycle methods for PEKK powder is that it is not possible to reliably build parts from Cake B powder. As a result, significant amounts of unsintered powder is wasted in the SLS process, resulting in significant expense.

Another disadvantage of known methods and powder compositions is that attempted SLS of Cake B powder PEKK causes unwanted variations in the thickness of the built part, particularly in out-of-plane surfaces resulting in nonconforming parts that are not acceptable to customers.

A disadvantage of performing SLS on powder compositions with Cake B PEKK is that it is difficult to build objects when Cake B PEKK is included in the feedstock because it inhibits the application of powder in the SLS machine. For example, the Cake B may cause pilling, sticking, and other forms of fouling in steps of the SLS process in which smooth flowing powder are required. Therefore, it is understood that it is not possible to operate the SLS machine to build parts using Cake B PEKK.

Another disadvantage of the SLS process using Cake B is that it results in parts that difficult to remove from the powder bed and clean relative to parts made from virgin powder or Cake A powder.

SUMMARY

The needs set forth herein as well as further and other needs and advantages are addressed by the present teachings, which illustrate solutions and advantages described below.

It is an objective of the present teachings to remedy the above drawbacks and issues associated with prior art selective laser sintering methods and powder compositions.

The present invention resides in one aspect in a powder composition suitable for use in selective laser sintering for printing a three-dimensional object. The powder composition includes a first fraction comprising a polyetherketoneketone (PEKK) powder having a plurality of particles. The plurality of particles have a mean diameter between 30 μm to 90 μm. The powder composition includes a second fraction having a siloxane powder having a plurality of particles.

In yet a further embodiment of the present invention, the powder composition comprises a third fraction comprising carbon fiber, the third fraction is between 5% and 25% of the composition by weight.

In yet a further embodiment of the present invention, the PEKK powder has been previously used in a first SLS build having a bed temperature above 250° C.

In yet a further embodiment of the present invention, the PEKK powder has been previously used in a second SLS build having a bed temperature above 250° C.

In yet a further embodiment of the present invention, the second fraction is between 0.0% and 5.0% of the composition by weight.

In yet a further embodiment of the present invention, the second fraction is between 0.0% and 2.5% of the composition by weight.

In yet a further embodiment of the present invention, the second fraction is between 0.5% and 1.5% of the composition by weight.

In yet a further embodiment of the present invention, the second fraction is 1.0% of the composition by weight.

In yet a further embodiment of the present invention, the third fraction is 15% of the composition by weight.

In yet a further embodiment of the present invention, the plurality of siloxane particles have a mean diameter between 30 μm to 60 μm.

In yet a further embodiment of the present invention, the plurality of siloxane particles have a mean diameter between 40 μm to 50 μm.

The present invention resides in another aspect in a method for a layer-wise manufacturing of a three-dimensional object from the powder composition described above. The method includes the steps of applying a layer of the powder composition on a bed of a laser sintering machine, and then solidifying selected points of the applied layer of powder by irradiation. These steps are successively repeated until all cross sections of a three-dimensional object are solidified.

In yet a further embodiment of the present invention, the object formed has a strain to failure of at least 2.0%.

In yet a further embodiment of the present invention, the object formed has a strain to failure greater than a strain to failure of an object made from a PEKK powder composition excluding siloxane powder.

The present invention resides in another aspect in a method of preparing a powder composition suitable for use in laser sintering for printing a three-dimensional object. The method includes the steps of providing a polyetherketoneketone (PEKK) powder having a plurality of particles, providing a siloxane powder having a plurality of particles, and mixing the PEKK powder with the siloxane powder to obtain a powder composition suitable for use in selective laser sintering.

In yet a further embodiment of the present invention, the mixing of the PEKK powder and the siloxane powder is performed under dry conditions.

In yet a further embodiment of the present invention, the method includes the step of mixing the carbon fibers into the powder composition.

In yet a further embodiment of the present invention, the PEKK powder has been previously used in a first SLS build having a bed temperature above 250° C.

In yet a further embodiment of the present invention, the PEKK powder has been previously used in a second SLS build having a bed temperature above 250° C.

In yet a further embodiment of the present invention, the siloxane powder is between 0.0% and 5.0% of the composition by weight.

In yet a further embodiment of the present invention, the siloxane powder is between 0.0% and 2.0% of the composition by weight.

In yet a further embodiment of the present invention, the second fraction is between 0.5% and 1.5% of the composition by weight.

DETAILED DESCRIPTION

Figure 1:
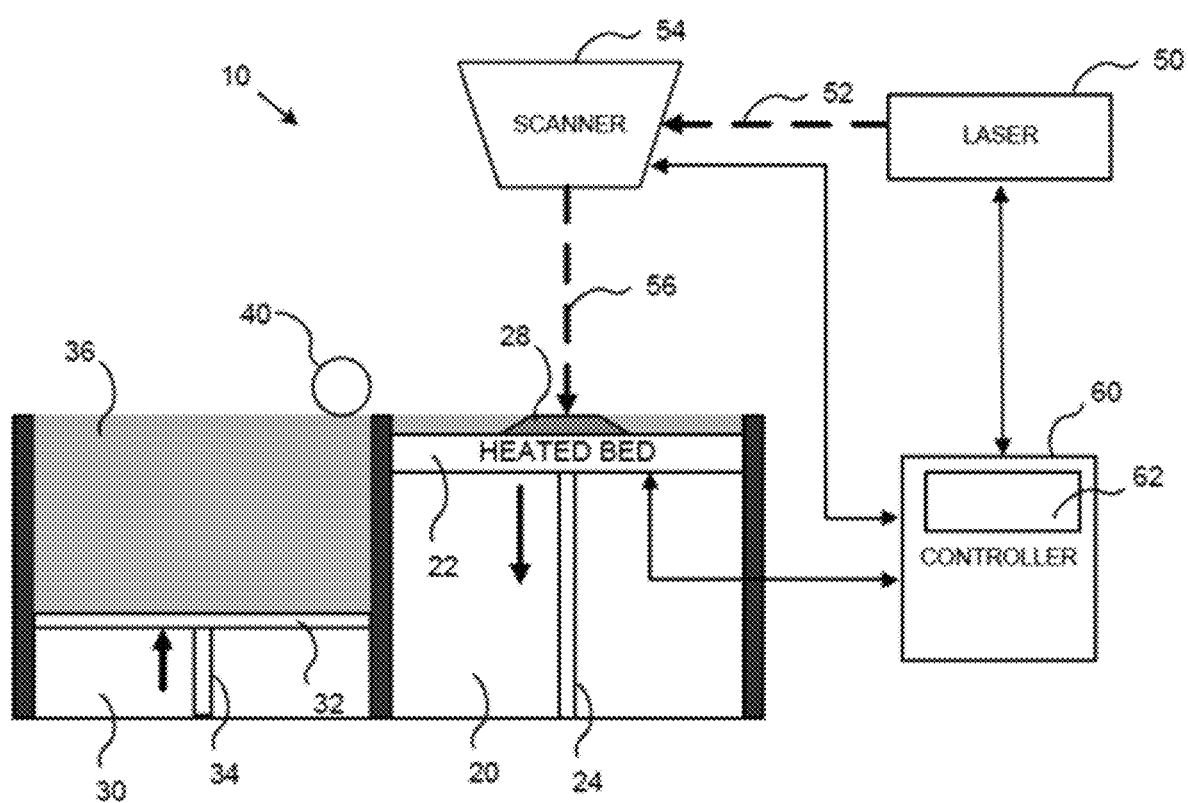
FIG. 1 illustrates a LS machine in accordance with one embodiment of the present invention.

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

The present invention is especially useful for preparing polymer powders for laser sintering. One such class of polymer powders is Polyaryletherketones ("PAEK") polymers. PAEKs are of interest in the SLS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK").

PEKKs are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include, as repeating units, two different isomeric forms of ketone-ketone. These repeating units can be represented by the following Formulas I and II:

-A-C(=O)—B—C(=O)—          Formula I

-A-C(=O)—D-C(=O)—          Formula II where A is a p,p'-Ph—O—Ph-group, Ph is a phenylene radical, B is p-phenylene, and D is m-phenylene. The Formula I:Formula II isomer ratio, commonly referred to as the T:I ratio, in the PEKK is selected so as to vary the total crystallinity of the polymer. The T:I ratio is commonly varied from 50:50 to 90:10, and in some embodiments 60:40 to 80:20. A higher T:I ratio such as, 80:20, provides a higher degree of crystallinity as compared to a lower T:I ratio, such as 60:40.

The crystal structure, polymorphism, and morphology of homopolymers of PEKK have been studied and have been reported in, for example, Cheng, Z. D. et al, "Polymorphism and crystal structure identification in poly(aryl ether ketone ketone)s," Macromol. Chem. Phys. 197, 185-213 (1996), the disclosure of which is hereby incorporated by reference in its entirety. This article studied PEKK homopolymers having all para-phenylene linkages [PEKK(T)], one meta-phenylene linkage [PEKK(I)], or alternating T and I isomers [PEKK(T/I)]. PEKK(T) and PEKK(T/I) show crystalline polymorphism depending upon the crystallization conditions and methods.

In PEKK(T), two crystalline forms, forms I and II, are observed. Form I can be produced when samples are crystallized from melting at low supercooling, while Form II is typically found via solvent-induced crystallization or by cold-crystallization from the glassy state at relatively high supercooling. PEKK(I) possesses only one crystal unit cell which belongs to the same category as the Form I structure in PEKK(T). The c-axis dimension of the unit cell has been determined as three phenylenes having a zig-zag conformation, with the meta-phenylene lying on the backbone plane. PEKK(T/I) shows crystalline forms I and II (as in the case of PEKK(T)) and also shows, under certain conditions, a form III.

Suitable PEKKs are available from several commercial sources under various brand names. For example, polyetherketoneketones are sold under the brand name OXPEKK® polymers by Oxford Performance Materials, South Windsor, Connecticut. Polyetherketoneketone polymers are also manufactured and supplied by Arkema. In addition to using polymers with a specific T:I ratio, mixtures of polyetherketoneketones may be employed.

The powders used in these applications are produced by a variety of processes such as grinding, air milling, spray drying, freeze-drying, or direct melt processing to fine powders. The heat treatment can be accomplished before or after the powders are produced, but if treated prior to forming the powders, the temperature of the powder forming process must be regulated to not significantly reduce the melting temperature or the quantity of the crystallinity formed in the heat treatment process.

In the method of preparing the powders in accordance with the present invention, a raw PEKK flake is provided. The raw PEKK flake is commercially available from companies such as Arkema, Inc. of King of Prussia, PA, and Cytec Industries Inc. of Woodland Park, NJ. The raw PEKK flake is typically swilled from a chemical reactor and then washed. The raw PEKK flake is a non-powder material. That is, the raw PEKK flake is not in the form of a powder that can be used in the LS. The raw PEKK flake is in the form of irregularly-shaped particles (e.g., particles that are vaguely round, elongated, flat, etc.) and has an appearance similar to that of Rice Krispies® cereal. The irregularly-shaped particles of the raw PEKK flake have grain sizes that are orders of magnitude larger than 150 μm, for example. The remainder of the raw PEKK flake can be in the form of a gel or gel-like form caused by an amount of liquid solvent remaining from the process of producing the raw PEKK.

After the step of providing the raw PEKK flake, a heat treatment step is optionally performed prior to grinding. The heat-treatment process is the subject of U.S. patent application Ser. No. 15/872,478 filed on Jan. 16, 2018 by Hexcel Corporation and titled "Polymer Powder and Method of Using the Same." The disclosure of that reference is hereby incorporated by reference. After the heat-treating step, a cooling step is performed that involves powering-off the convection oven and allowing the raw PEKK to cool naturally.

After the cooling step, a grinding or milling step is performed that involves grinding the raw PEKK flake to form what will hereinafter be referred to as the "PEKK powder." The grinding step can be performed using known grinding techniques performed by companies such as Aveka, Inc. of Woodbury, MN. Upon completion of the grinding step, the particles of the PEKK powder are significantly smaller (i.e., several degrees of magnitude smaller) than the particles of the raw PEKK. The particles of the PEKK powder are more consistent and regular in shape as compared to the particles of the raw PEKK; however, the particles of the PEKK powder are still irregularly-shaped in comparison to the spherical-shaped particles.

A person of ordinary skill in the art and familiar with this disclosure will understand that the grinding may also be referred to as pulverization, milling, or jet milling. In addition, a person of ordinary skill in the art and familiar with this disclosure will understand that it may also be employed with other polymer powders, including those in the PAEK family.

The particles in accordance with the present invention were ground from the flake. A mill is used that incorporates dense phase micronization using turbulent, free jets in combination with high efficiency centrifugal air classification within a common housing. This provides comminution by high probability of particle-on-particle impact for breakage and a high degree of particle dispersion for separation. The resultant particles are non-spherical and substantially angular. This is a result of the jet milling process that performs particle comminution via particle-on-particle impact. The substantial non-spherical PEKK particles perform better in the LS process. For example, the non-spherical particles are more easily distributed on the bed table for the LS process and the non-spherical particles result in substantially stronger parts, particularly in the out-of-plane axis. The increased performance of non-spherical particles is due in part to the increased ability for larger and smaller particles to pack together enhancing the strength of the laser fusion.

The raw PEKK flake is ground into a PEKK powder comprising a plurality of PEKK particles. The PEKK particles range in size from less than 10 μm to about 200 μm. A person of ordinary skill in the art and familiar with this disclosure will understand that the particle size range will vary based on the type of polymer being milled and the specific parameters of the milling process.

After the milling, an air classification method may be used to separate fine particles from the milled PEKK powder. It is known in the art that it is necessary to reduce or eliminate particles having a diameter below a cut-off point, for example 30 µm, as it has been found that particles in this range prevent use of the powder in the LS process. For example, International Patent Application WO2014100320 discloses such a method for preparing powders for use in selective laser sintering.

After the grinding step, another optional processing step is performed that involves adding an amount of carbon fiber to the PEKK powder. The mixing process is the subject of US Publication No. US20180201783 published on Jul. 17, 2018 by Hexcel Corporation and titled "Polymer Powder and Method of Preparing the Same." The disclosure of that reference is hereby incorporated by reference.

In accordance with one embodiment of the present invention carbon fiber available from Hexcel Corporation of Stamford, Connecticut, USA and sold under the brand name HEXTOW® AS4 is employed. The carbon fiber is a continuous, high strength, high strain, PAN based fiber. In this embodiment, the carbon fiber has a filament diameter of approximately 7.1 µm and is wound on a cardboard tube. It should be understood to a person having ordinary skill in the art that different types and brands of carbon fibers may be employed, and that the present invention is not specifically limited in this regard. The carbon fiber is milled prior to incorporation into the PEKK powder to achieve the desired carbon fiber length as determined by the average L50. The carbon fiber is milled by a miller such as E&L Enterprises Inc. in Oakdale, TN, USA. For example, in one embodiment of the present invention, the mean carbon length, L50, is 77 µm. The minimum length measured is 38.15 µm, the maximum length measured is 453 µm, and the standard deviation is 42.09 µm.

A powder composition suitable for use in a selective laser sintering for printing a three-dimensional object is prepared combining a PEKK powder with the carbon fiber. In some embodiments of the present invention the composition includes 85% by weight of PEKK powder and 15% by weight carbon fiber. It yet other embodiments of the present invention, the amount of carbon fiber is varied relative to the polymer powder to achieve composition for SLS. In some embodiments of the present invention, one or more additives are added to the matrix to affect the properties of the SLS composition, for example, during the printing process or in the printed article. It will be understood to a person of ordinary skill in the art and familiar with this invention, that the ratio of carbon to polymer may vary and the above examples are provided for illustration purposes.

According to one embodiment of the present invention, in reference to FIG. 1, a LS system 10 in accordance with the present invention is illustrated. The system 10 includes a first chamber 20 having an actuatable piston 24 deposed therein. A bed 22 is deposed at an end of the piston 24. It should be understood that the term bed may refer to the physical structure supported on the piston or the uppermost layer of powder deposed thereon.

The temperature of the bed 22 can be variably controlled via a controller 60 in communication with heating elements (not shown) in or around the bed 22. Furthermore, the LS system 10 according to the invention may include a heating device (not shown) above the bed 22, which preheats a newly applied powder layer up to a working temperature below a temperature at which the solidification of the powder material occurs. The heating device may be a radiative heating device (e.g., one or more radiant heaters) which can introduce heat energy into the newly applied powder layer in a large area by emitting electromagnetic radiation.

A second chamber 30 is adjacent to the first chamber 20. The second chamber 30 includes a table surface 32 disposed on an end of a piston 34 deposed therein. A powder 36 for use in the LS system 10 is stored in the second chamber 30 prior to the sintering step. It will be understood to a person of ordinary skill in the art and familiar with this disclosure that while a specific embodiment of a LS system is disclosed, the present invention is not limited thereto, and different known LS systems may be employed in the practice of the present invention.

During operation of the LS system 10, a spreader 40 translates across a top surface of the first chamber 20, evenly distributing a layer of powder 36 across onto either the top surface of the bed 22 or the material previously deposed on the bed 22. The LS system 10 preheats the powder material 36 deposed on the bed 22 to a temperature proximate to a melting point of the powder. Typically, a layer of powder is spread to have a thickness of 125 µm, however the thickness of the layer of powder can be increased or decreased depending on the specific LS process and within the limits of the LS system.

A laser 50 and a scanning device 54 are deposed above the bed 22. The laser 50 transmits a beam 52 to the scanner 54, which then distributes a laser beam 56 across the layer of powder 36 deposed on the bed 22 in accordance with build data. The laser selectively fuses powder material by scanning cross-sections generated from a three-dimensional digital description of the part on the surface of the bed having a layer of the powder material deposed thereon. The laser 50 and the scanner 54 are in communication with the controller 60. After a cross-section is scanned, the bed 22 is lowered by one layer thickness (illustrated by the downward arrow), a new layer of powdered material is deposed on the bed 22 via the spreader 40, and the bed 22 is rescanned by the laser. This process is repeated until a build 28 is completed. During this process, the piston 34 in the second chamber is incrementally raised (illustrated by the upward arrow) to ensure that there is a sufficient supply of powder 36.

The inventors have identified a disadvantage SLS of PEKK powder and SLS of PEKK powder with carbon fiber additive is that it is not possible to print parts from Cake B PEKK. The first problem is that Cake B performs very poorly during the powder coating process in the SLS machine relative to virgin powder and Cake A. The Cake B PEKK powder tends to clump together and foul the coating process such that it causes many SLS builds, which can last between several hours and several days depending on the depth of the build, to fail. As a result of these failures it is understood that Cake B PEKK cannot be used to print parts on a commercial scale.

In some circumstances it is possible to avoid the powder application issues with Cake B PEKK and print parts using the SLS process. In these circumstances, the SLS process remains commercially unfeasible because the removal of the sintered parts from the powder bed is substantially more time consuming and difficult because the unsintered powder is difficult to remove from the built parts relative to parts made from Cake A and virgin. The unsintered powder tends to clump to the part and inhibit removal of the part from the powder bed rendering use of Cake B PEKK unfeasible.

Figure 2:
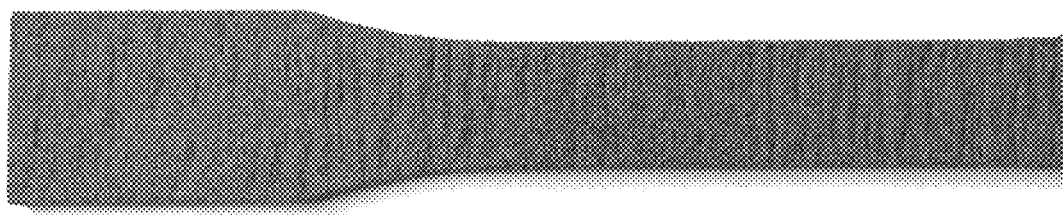
FIG. 2 is an image of a portion of a part built from Cake B PEKK and carbon fiber using SLS.

Another disadvantage of printing SLS Cake B PEKK, to the extent it is possible, is that it results in parts with significant deviations in part thickness between the built part in the design file inputted into the SLS machine. The thickness deviations are visible in out-of-plane surfaces in the form of striping on the surface of parts. This is sometimes referred to as striping or tiger striping. In reference to FIG. 2, an image showing a portion of a part built from Cake B PEKK with 15% carbon fiber using SLS is shown. In this image, the striping is readily visible on the surface of the built part.

The striping in the surface of the part precludes use of PEKK B for several reasons. First, the striping negatively affects the aesthetics of the constructed part, thereby reducing the desirability of the SLS printed part by customers. Second, the deviations thickness are to such an extent that the parts are consistently rejected by customers, particularly in aerospace and other areas that require high precision manufacturing. For example, a customer may accept parts that are within −0.010"/+0.020" of the specified drawing dimension. Companies such as the Applicant can routinely print SLS parts using virgin PEKK and Cake A PEKK that meet this requirement. However, it is not possible to reliably print SLS parts from Cake B that meet this requirement.

The inventors have observed through significant research, analysis and review that as the PEKK powder is subject to ambient temperatures in the SLS chamber, typically less then 20 C below the highest melting point of the PEKK, the acceptable window for the ambient chamber temperature narrows. A person of skill in the art and familiar with this disclosure will understand that the ambient chamber temperature is also referred to as bed temperature. In the SLS machine used by the Applicant, the EOS PSINT800, the ambient chamber temperature or bed temperature is measured by an infrared sensor that measures a fixed point on the bed surface. A bed temperature setpoint is maintained via a controlled system that adjusts radiant heaters above the bed in response to the temperature detected by the infrared sensor.

With virgin PEKK powder with 15% fiber carbon, the inventors have observed an approximately 10° C. acceptable window in bed temp set point. For example, the bed temperature setpoint is determined to be 270° C. based on an analytical method. The inventors have discovered that it is possible to operate the SLS machine using this powder at the determined bed temperature of 270° C.+ or −5° C. without observing fouling issues in the powder application, powder removal, or part qualification. The SLS machine controls the bed temperature setpoint to within +−3 C of the setpoint. As a result, there is a high certainty that the bed temperature is maintained within the acceptable window for the virgin PEKK+15% carbon fiber.

During the first run in the SLS chamber, the unsintered powder is exposed to the ambient bed temperature during the duration of the build. After the build, the exposed unsintered powder is referred to as Cake A. Cake A can then be used in a subsequent SLS build. First, the bed temperature setpoint for the Cake A is determined using the analytical method. The inventors have discovered bed temperature exposure history of Cake A narrows the acceptable bed temperature operating window for subsequent SLS builds to about 5 or 6 C. Therefore, it is still highly likely that the SLS machine can maintain the required bed temperature for Cake A.

With Cake B, the acceptable window is 1 or 2° C. Therefore, with a machine that runs +−3° C., it is not possible to run the machine consistently within the required window.

The inventors have overcome this problem by employing the siloxane resin additive. It improves flow of the heat degraded PEKK powder in the machine. The inventors have discovered that by dry blending siloxane powder with the Cake B it is possible to repeatedly print parts using SLS without variation in part thickness, or without issues associated with powder application or part removal. The siloxane agent also improved the toughness of the material unexpectedly. The benefits of siloxane additive and preferred amounts are discussed further below.

EXAMPLES

The tables below include data associated with three different PEKK powders. Each powder comprises Cake B PEKK that was prepared in accordance with the method described below. Test specimens were printed in both in-plane and out-of-plane directions using the prepared powders via an SLS machine and tested in accordance to ASTM D6272 (flexural) and ASTM D638 (tensile).

TABLE 1

| Example | Batch | Composition (% wt.) | | | $T_M$ (° C.) |
| | | Cake B | Carbon | Siloxane | |
| --- | --- | --- | --- | --- | --- |
| Example 1 | 1734 | 85 | 15 | 0 | 306.98 |
| Example 2 | 1870 | 84.15 | 14.85 | 1 | 307.60 |
| Example 3 | 2116 | 83.3 | 14.7 | 2 | 307.06 |

In reference to Table 1, data regarding the tested powder compositions is provided. Example 1 refers to powder batch 1734. The batch includes 85% Cake B, or PEKK powder that had been exposed to ambient chambers temperatures during two SLS builds, by weight. Example 1 further includes 15% carbon fiber by weight. It does not include any siloxane. The powder composition of example 1 has a melting temperature of around 307.0° C.

Example 2 refers to powder batch 1870. The powder batch includes 84.15% Cake B by weight. The Cake B PEKK powder is sourced from the same Cake B powder used to prepare the powder composition of Example 1. Example 2 includes 14.85% carbon fiber by weight. It includes 1% siloxane by weight. The powder composition of example 2 has a melting temperature of around 307.6° C.

Example 3 refers to powder batch 2116. The powder batch includes 83.3% Cake B by weight. The Cake B PEKK powder is sourced from the same Cake B powder used to prepare the powder composition of Example 1. Example 3 includes 14.7% carbon fiber by weight. It includes 2% siloxane by weight. The powder composition of example 3 has a melting temperature of around 307.1° C.

In each of the tested powder compositions, the raw PEKK flake had a T:I ratio of 60:40 and was supplied by either Arkema, Inc. of King of Prussia, PA, or Cytec Industries Inc. of Woodland Park, NJ. In each example, the raw PEKK flake was subject to a heat treatment step to remove impurities from the PEKK flake. As described above, the temperature was ramped up to 200° C. over a one-hour period. The temperature was then held at 200° C. for about six hours. The temperature was then ramped up a second time to 225° C. The temperature was then held at 225° C. for a minimum of one hour. The temperature was then ramped up a third time to 250° C. and held for at least one hour.

After heat treatment, the PEKK flake was milled by jet milling resulting in a plurality of particles ranging in size from less than 10 μm to about 200 μm. The milling process was performed using 3000 lbs. lots of PEKK flake. After milling air classification was used to separate fine particles from the milled lots. The classification was set to remove particles having a diameter of 30 μm or less from each lot. This is referred to as fines material, whereas the remainder of the milled lot may be referred to a non-fines material. In some embodiments of the present invention, the fines may be added back into the composition.

In each of the lots shown in Table 1, the PEKK powder forming the basis of the Cake B was mixed with carbon fiber when the PEKK powder was in its virgin form. The siloxane was added after two SLS builds forming the Cake B. The virgin powder and carbon fiber were mixed in a Zeppelin FM-200 mixer. A first fraction of virgin powder was added and a second fraction of carbon fiber was added. In each of the examples, the carbon fiber was 15% by weight of the resultant powder composition and the percentage of virgin PEKK powder was 85% by weight. The virgin PEKK powder had a mean size greater than 30 μm and more specifically a mean size between 40 μm and 70 μm.

Figure 5:
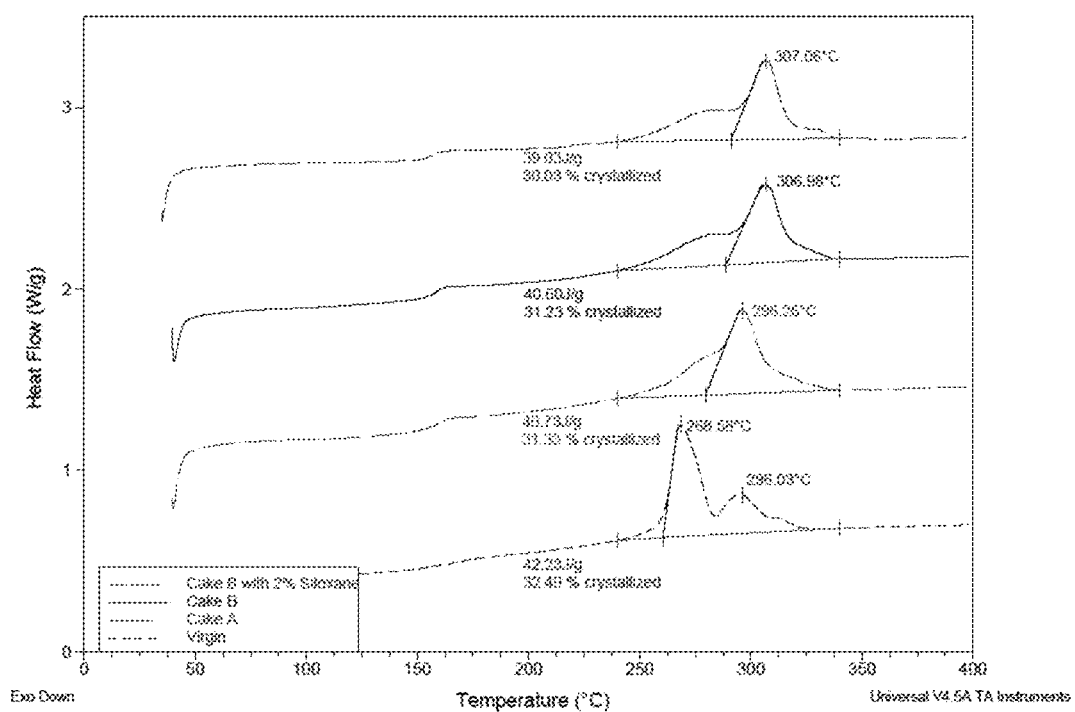
FIG. 5 is chart showing temperature data for powder compositions.

In order to form the Cake B PEKK powder, the virgin PEKK powder and carbon fiber mixture was used in two prior separate SLS builds to form the Cake B powder. The bed temperature for each build was determined pursuant to U.S. Pat. No. 10,112,342 to Hexcel Corp. for a Method of Analytically Determining SLS Bed Temperatures, the disclosure of which is hereby incorporated by reference. The bed temperature for each SLS build is between the melting temperature $T_M$ of the material and 20° C. below the $T_M$. In reference to FIG. 5, DSC data for each powder type is shown and the associated melting temperature. Virgin powder exhibits two melting points. The upper melting point is used to determine the bed temperature. In each case, the powder is exposed to the bed temperature for at least several hours during the SLS build. After the build, the sintered parts are removed from the bed and unsintered powder, now referred to as Cake A, is sieved and prepared for subsequent SLS builds. After the second build, the PEKK powder is referred to as Cake B. It includes about 85% PEKK by weight and about 15% by carbon by weight.

The powder compositions of Example 2 and Example 3 were prepared from the Cake B powder obtained from the methods above. In preparing the Example 2, 99 lbs. of Cake B was obtained and then separated into thirty three individual three pound bags using a scale. One pound of siloxane resin was obtained. In these examples DOWSIL 4-7018 Siloxane resin was used, however, the present invention is not limited in this regard and other sources of siloxane may be employed. The components were mixed using a high shear mixer. In these tests, a Robot Coupe® kitchen mixer was used. 1.5 lbs of Cake B was added to the bowl of the mixer. Then 13.75 grams of the siloxane resin was added on top of the Cake B. An additional 1.5 lbs. of Cake B was added to the mixing bowl. The material was then subjected to four mixing times of thirty seconds. The mixed material was then deposited into a lined drum and the steps were repeated until all of the bags were mixed. The hand drum was subsequently hand mixed prior to the SLS process. Example 3 was prepared in a similar manner with the exception that 98 lbs. of Cake B PEKK powder was used and two pounds of siloxane resin was used. It should be understood to a person of ordinary skill in the art and familiar with this disclosure that the present invention is not limited in this regard, and that the mixing procedure may be scaled or performed in a different manner. For example, the components may be mixed in a production size high-shear mixer.

The test results below were performed with siloxane resin available from Dow Corning® under the name 4-7081 resin modifier. The siloxane is provided as a plurality of dry particles having an average particle size of 45 μm. Thus, the average size of the siloxane powder is similar to the average size of the PEKK powder, thereby facilitating printing.

In order to test the powder compositions in the SLS process an SLS print job was performed using each powder composition to print testing specimens in accordance with ASTM D638 (tensile) and ASTM D6272 (flexural). ASTM D638 is a common plastic strength specification and covers the tensile properties of unreinforced and reinforced plastics. The test method uses standard "dumbbell" or "dogbone" shaped specimens that are tested on tensile testing machine. For each powder composition at least five test specimens were manufactured in the in-plane direction, also referred to as the x-direction. Each of the test specimens were tested pursuant to ASTM D638 and the results for each direction for each powder were averaged.

ASTM D6272 is a common plastic strength specification and covers the flexural properties of unreinforced and reinforced plastics by four-point bending. The test method uses standard rectangular shaped specimens that are tested. For each powder composition at least five test specimens were manufactured in the in-plane direction, also referred to as the x-direction, and at least five test specimens were manufactured in the out-of-plane direction or the z-direction. Each of the test specimens were tested pursuant to ASTM D6272 and the results for each direction for each powder were averaged.

For each tested powder composition, the SLS builds were performed in a P800 machine. The process chamber temperature for each powder composition was determined in accordance with an analytical method for determining the bed temperature of an SLS machine. The laser power, or exposure, for each qualification was 6 W. The laser power was determined in accordance with U.S. patent application Ser. No. 15/872,496 filed on Jan. 16, 2018 by Hexcel Corporation and titled "Method for Analytically Determining Laser Power for Laser Sintering."

The qualification builds using the 1% siloxane and the 2% siloxane consistently satisfied the acceptance criteria for the build requirements relative to the Cake B with 0% siloxane. The parts unexpectedly did not include any evidence of tiger striping commonly appearing in Cake B SLS without siloxane. In addition, the powder with 1% and 2% siloxane showed improved printing capability and part removal. All of these improvements benefit the economics of SLS of PEKK. Unexpectedly, the siloxane addition also improved the toughness of the material, which is a property that customers have been interested in.

TABLE 2

| | | X-Direction 4-Point Flex | | | | |
|---|---|---|---|---|---|---|
| Ex. | Material | Batch # | n | Strength (ksi) | Modulus (ksi) | Strain (%) |
| 1 | 0% Siloxane | 1734 | 5 | 21.3 | 898 | 2.35 |
| 2 | 1% Siloxane | 1870 | 5 | 24.8 | 906 | 2.99 |
| 3 | 2% Siloxane | 2116 | 5 | 20.4 | 729 | 3.05 |

Table 2 shows the testing results for the 4-point flexural test for the in-plane test specimens. Parts made from the powder composition with 1% siloxane showed a 16% increase in strength relative to the Example 1 control. The modulus of elasticity remained essentially the same. The strain showed an increase of 27% over the Example 1 control. The increase in the strength and the strain are unexpected and considered desirable in the market. The test coupons did not show any unacceptable deviations in thickness or show any indication of tiger striping and all test coupons were with −0.010"/+0.020" of the specified dimension. During the build process there were no coating issues or powder applications issues observed with the Example 2 powder. After the SLS process, the sintered parts were relatively easy to remove from the cake bed as opposed to sintered parts made from Cake B without siloxane.

Parts made from the powder composition with 2% siloxane showed a 4% decrease in strength relative to the Example 1 control. The modulus of elasticity increased by 2% relative to the control. The strain showed an increase of 30% over the Example 1 control. The increase in the strain is unexpected and considered desirable in the market. The test coupons printed from 2% siloxane did not show any unwanted deviations in thickness or show any indication of tiger striping and all test coupons were with −0.010"/+0.020" of the specified dimension. During the build process there were no coating issues or powder applications issues observed with the Example 3 powder. After the SLS process, the sintered parts were relatively easy to remove from the cake bed as opposed to sintered parts made from Cake B without siloxane.

TABLE 3

Z-Direction 4-Point Flex

| Ex. | Material | Batch | n | Strength (ksi) | Modulus (ksi) | Strain (%) |
|---|---|---|---|---|---|---|
| 1 | 0% Siloxane | 1734 | 5 | 17.9 | 812 | 2.16 |
| 2 | 1% Siloxane | 1870 | 4 | 17.3 | 804 | 2.26 |
| 3 | 2% Siloxane | 2116 | 5 | 9.17 | 542 | 1.72 |

Table 3 shows the testing results for the 4-point flexural test for the out-of-plane test specimens. Parts made from the powder composition with 1% siloxane showed a 3% decrease in strength relative to the Example 1 control. The modulus of elasticity remained essentially the same. The strain showed an increase of 5% over the Example 1 control. The test coupons did not show any unacceptable deviations in thickness or show any indication of tiger striping and all test coupons were with −0.010"/+0.020" of the specified dimension. During the build process there were no coating issues or powder application issues observed with the Example 2 powder. After the SLS process, the sintered parts were relatively easy to remove from the cake bed as opposed to sintered parts made from Cake B without siloxane.

Parts made from the powder composition with 2% siloxane showed a 49% decrease in strength relative to the Example 1 control in the z-axis. The modulus of elasticity decreased by 33% relative to the control. The strain showed decrease of 20% over the Example 1 control. The test coupons printed from 2% siloxane did not show any unwanted deviations in thickness or show any indication of tiger striping and all test coupons were with −0.010"/+0.020" of the specified dimension. During the build process there were no coating issues or powder application issues observed with the Example 2 powder. After the SLS process, the sintered parts were relatively easy to remove from the cake bed as opposed to sintered parts made from Cake B without siloxane. While the 2% siloxane addressed issues regarding powder application, build tolerances, and part removal, a material reduction in the strength as compared to 0% siloxane was observed. Likewise, a significant reduction in the strain was detected.

TABLE 4

X-Direction Tensile

| Ex. | Material | Batch | n | Strength (ksi) | Modulus (ksi) | Strain (%) |
|---|---|---|---|---|---|---|
| 1 | 0% Siloxane | 1734 | 10 | 15.9 | 1047 | 2.01 |
| 2 | 1% Siloxane | 1870 | 5 | 14.8 | 944 | 2.23 |
| 3 | 2% Siloxane | 2116 | 5 | 13.4 | 922 | 2.12 |

Table 4 shows the testing results for the tensile test for the in-plane test specimens. Parts made from the powder composition with 1% siloxane showed a 7% decrease in strength relative to the Example 1 control. The modulus of elasticity decreased by 10%. The strain showed an increase of 11% over the Example 1 control. The test coupons did not show any unacceptable deviations in thickness or show any indication of tiger striping and all test coupons were with −0.010"/+0.020" of the specified dimension. During the build process there were no coating issues or powder applications issues observed with the Example 2 powder. After the SLS process, the sintered parts were relatively easy to remove from the cake bed as opposed to sintered parts made from Cake B without siloxane.

Parts made from the powder composition with 2% siloxane showed a 16% decrease in strength relative to the Example 1 control. The modulus of elasticity decreased by 33% relative to the control. The strain showed an increase of 5% over the Example 1 control. The test coupons printed from 2% siloxane did not show any unacceptable deviations in thickness or show any indication of tiger striping and all test coupons were with −0.010"/+0.020" of the specified dimension. During the build process there were no coating issues or powder applications issues observed with the Example 2 powder. After the SLS process, the sintered parts were relatively easy to remove from the cake bed as opposed to sintered parts made from Cake B without siloxane.

Figure 3:
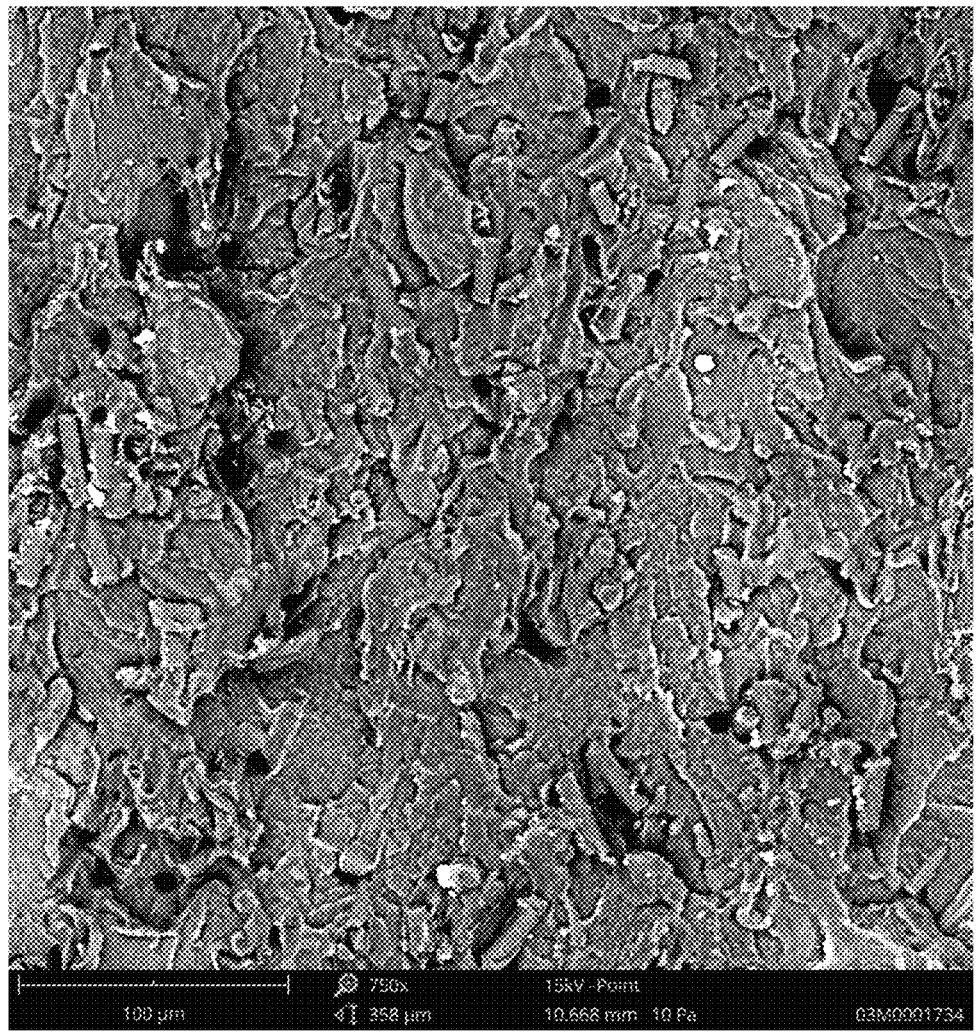
FIG. 3 is an image showing a magnified view of a cross section of a part built from CAKE B and carbon fiber.
Figure 4:
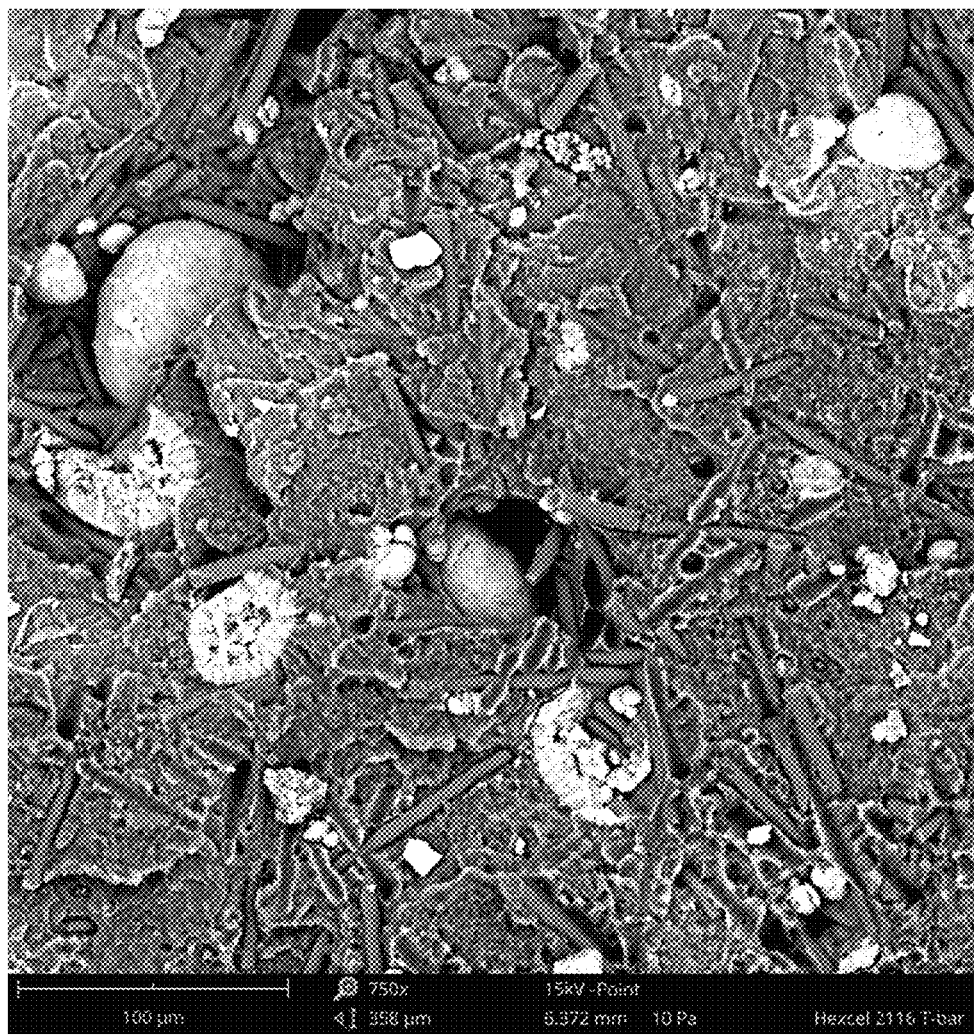
FIG. 4 is an image showing a magnified view of a cross section of a part built from CAKE B, carbon fiber, and siloxane.

In reference to FIGS. 3 and 4, images captured from a scanning electron microscope (SEM) of the printed PEKK coupons are shown. In FIG. 3, an image of a coupon printed from Example 1 powder is shown (no siloxane). Printed PEKK typically has a porosity of about 2% or less. The gaps in the printed Cake B are visible in FIG. 3. In reference to FIG. 4, in image of a coupon printed form Example 2 powder is shown (1% siloxane). The siloxane is shown in the picture filling in the gaps. The addition of the siloxane in the gaps services to enhance the strain of the examples 2 and 3, and particularly as it relates to Example 2 having 1% siloxane. The carbon fiber is also visible.

While the siloxane is first added to Cake B in the test samples, the present invention is not limited in that regard. For example, siloxane resin may be added to Cake A or to virgin powder. Likewise, while the present disclosure includes test examples that included 15% carbon fiber, the present invention is not limited in that regard. A person of skill in the art and familiar with this disclosure will understand that the siloxane may be used to enhance the building of recycled PEKK without carbon fiber.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A powder composition suitable for use in selective laser sintering for printing a three-dimensional object, the powder composition comprising:
a first fraction comprising a recycled polyetherketoneketone (PEKK) powder having a plurality of PEKK particles, the plurality of PEKK particles having a mean diameter between 30 μm to 90 μm;
a second fraction comprising a siloxane powder having a plurality of siloxane particles;
a third fraction comprising carbon fiber, the third fraction is between 5% and 25% of the composition by weight;
wherein the recycled PEKK powder has been previously used in a first SLS build having a bed temperature between an upper melting point of the PEKK before the first SLS build ($T_{M1}$) and 20° C. less than $T_{M1}$;
wherein the recycled PEKK powder has been previously used in a second SLS build having a bed temperature between an upper melting point of the PEKK after the first SLS build and before the second SLS build ($T_{M2}$) and 20° C. less than $T_{M2}$;
wherein the plurality of siloxane particles having a mean diameter between 30 μm to 60 μm;
wherein the second fraction is between 0.5% and 1.5% of the composition by weight.

2. The powder composition of claim 1 wherein the third fraction is 15% of the composition by weight.

3. The composition of claim 2 wherein the plurality of siloxane particles having a mean diameter between 40 μm to 50 μm.

4. The composition of claim 3, wherein the second fraction is 1.0% of the composition by weight.

5. A method for a layer-wise manufacturing of a three-dimensional object from the powder composition according to claim 1, comprising the steps of:
applying a layer of a powder composition on a bed of a laser sintering machine, the powder composition is the powder of claim 1;
solidifying selected points of the applied layer of powder by irradiation;
successively repeating the step of applying the powder and the step of solidifying the applied layer of recycled powder until all cross sections of a three-dimensional object are solidified.

6. The method of claim 5, wherein the object formed has a strain to failure of at least 2.0%.

7. The method of claim 5, wherein the object formed has a strain to failure greater than a strain to failure of an object made from a PEKK powder composition excluding siloxane powder.

8. A method of preparing a powder composition suitable for use in laser sintering for printing a three-dimensional object, the method including the steps of:
providing a first fraction comprising a polyetherketoneketone (PEKK) powder having a plurality of PEKK particles;
providing a third faction comprising carbon fiber;
mixing the first fraction and the third fraction to form a mixture;
preparing recycled PEKK from the mixture by the following steps:
heating the mixture in a first SLS build having a bed temperature between an upper melting point of the PEKK before the first SLS build ($T_{M1}$) and 20° C. less than $T_{M1}$;
heating the mixture in a second SLS build having a bed temperature between an upper melting point of the PEKK after the first SLS build and before the second SLS build ($T_{M2}$) and 20° C. less than $T_{M2}$;
providing a second fraction comprising a siloxane powder having a plurality of siloxane particles, the plurality of siloxane particles having a mean diameter between 30 μm to 90 μm;
mixing the recycled PEKK powder with the siloxane powder to obtain a powder composition suitable for use in selective laser sintering;
wherein the third fraction is between 5% and 25% of the composition by weight;
wherein the second fraction is between 0.5% and 1.5% of the composition by weight.

9. The method of claim 8 wherein the mixing of the PEKK powder and the siloxane powder comprises dry blending.

10. The method of claim 8, wherein the third fraction is 15% of the composition by weight, the plurality of siloxane particles having a mean diameter between 40 μm to 50 μm, and the second fraction is 1.0% of the composition by weight.

* * * * *